Patented Apr. 20, 1937

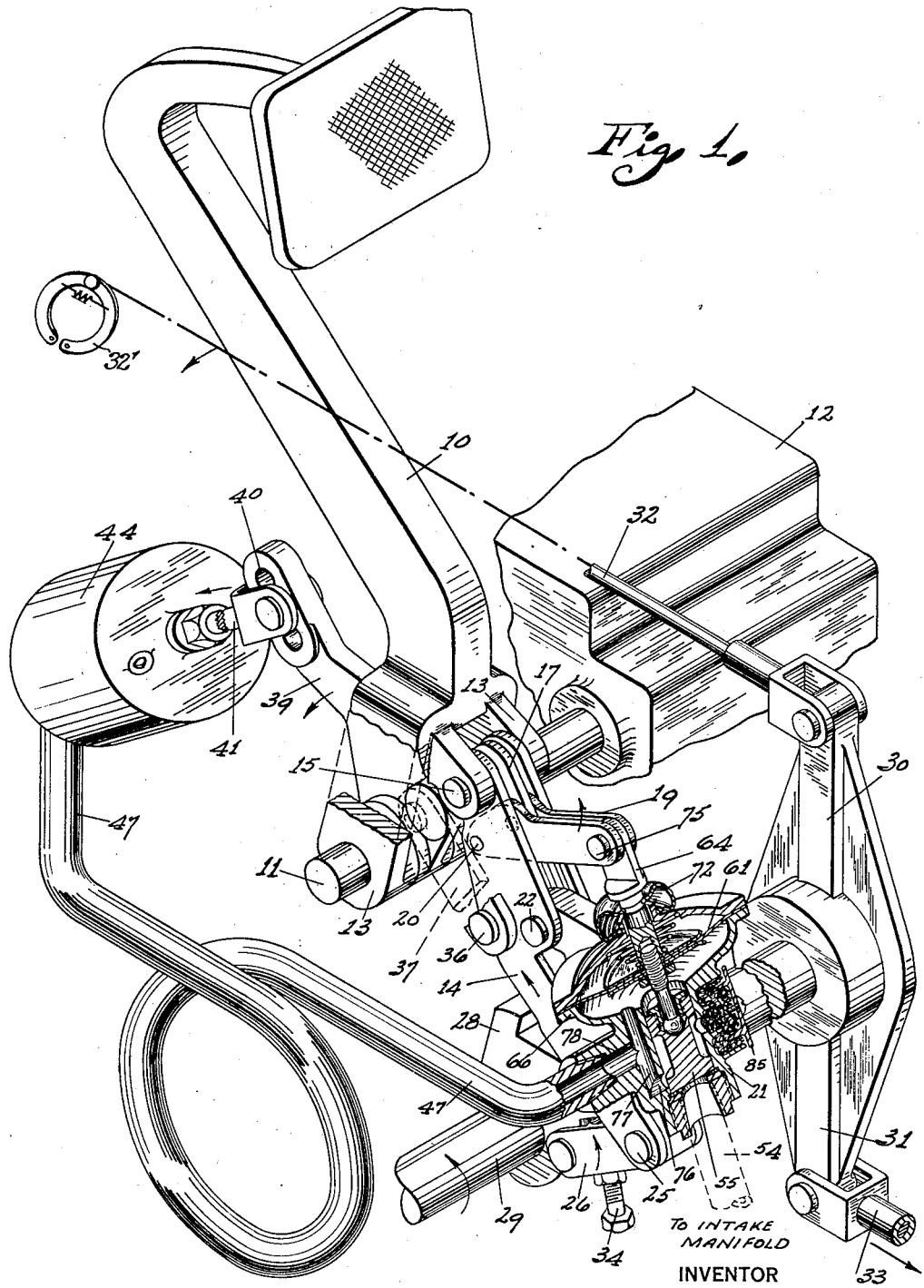

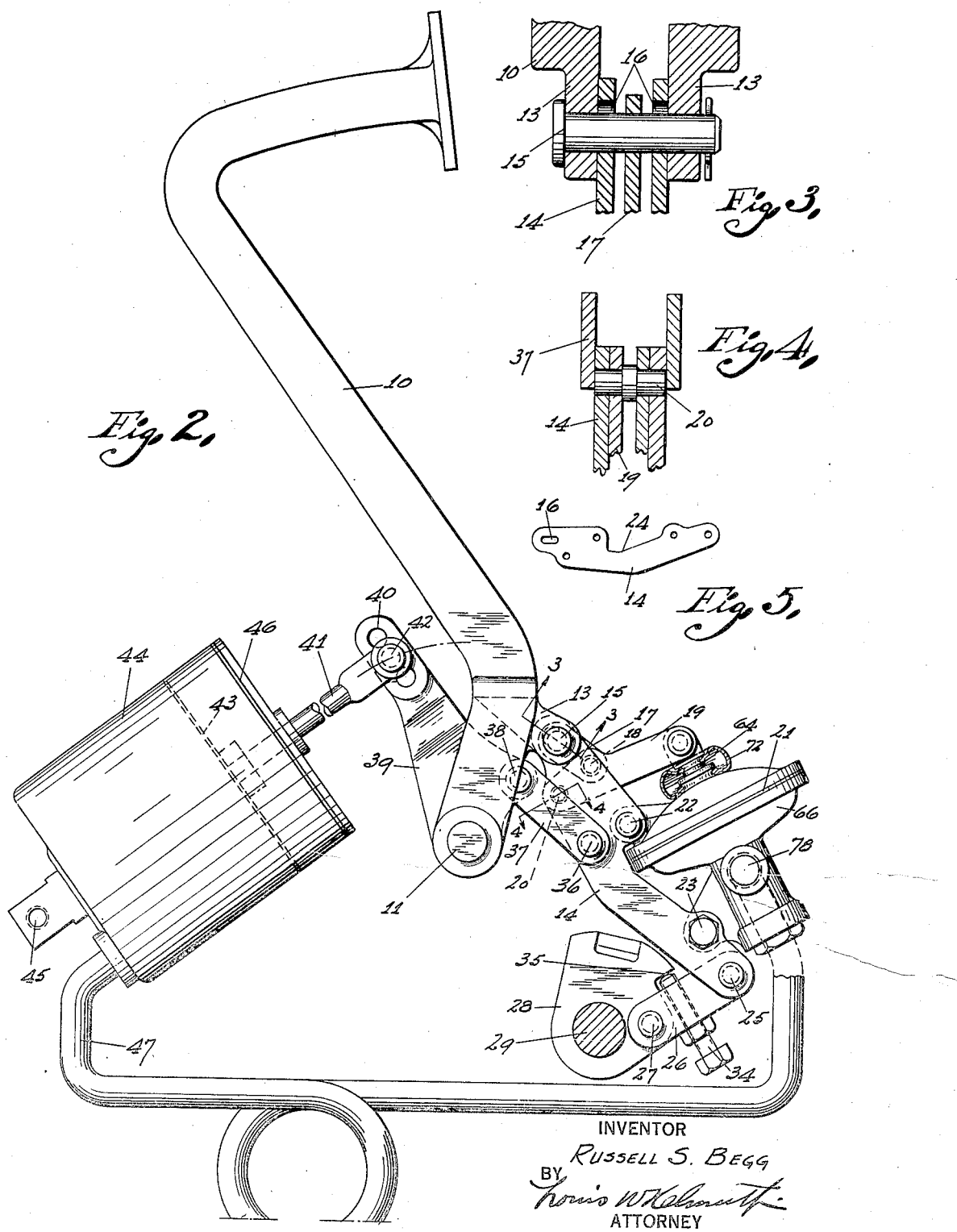

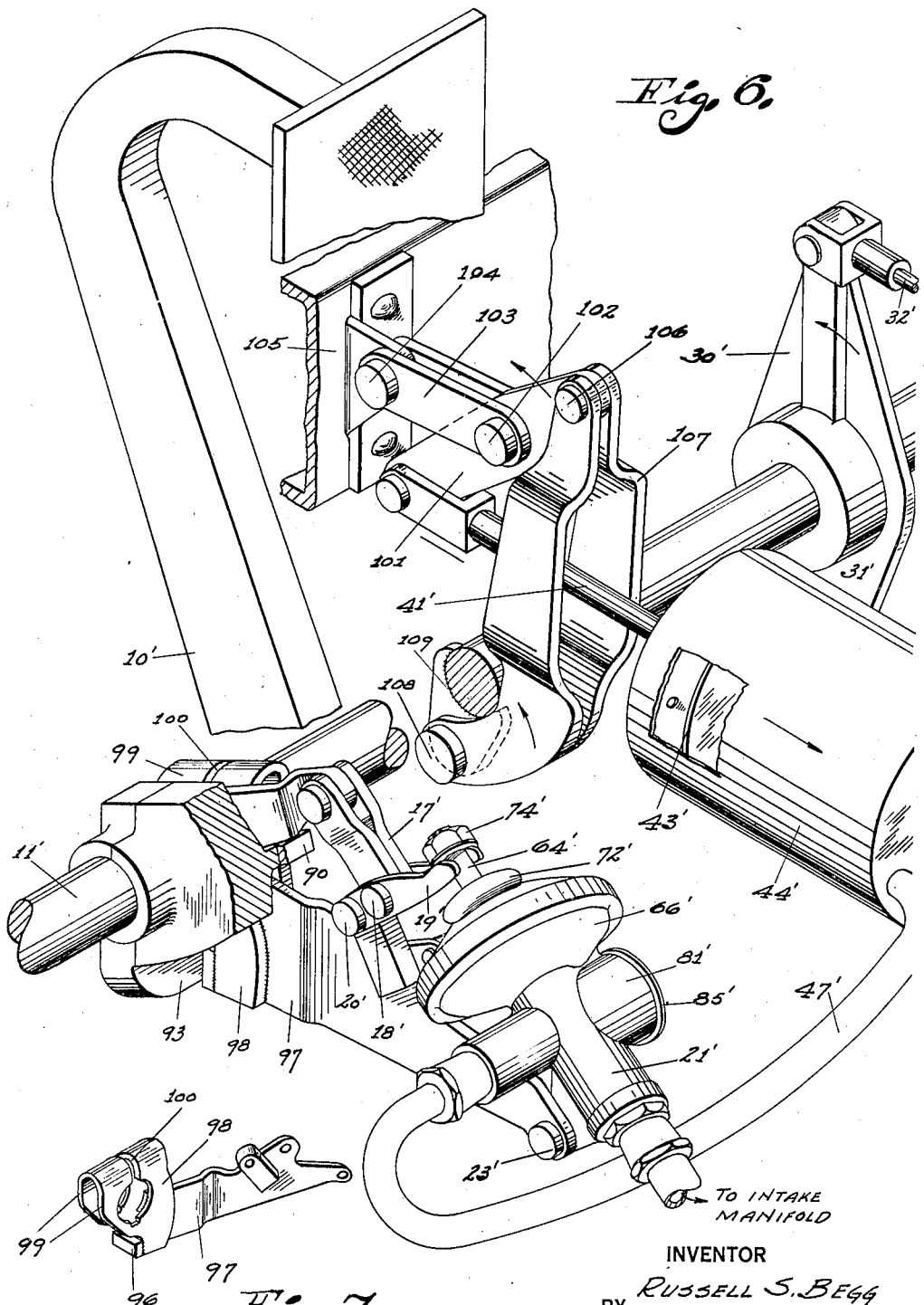

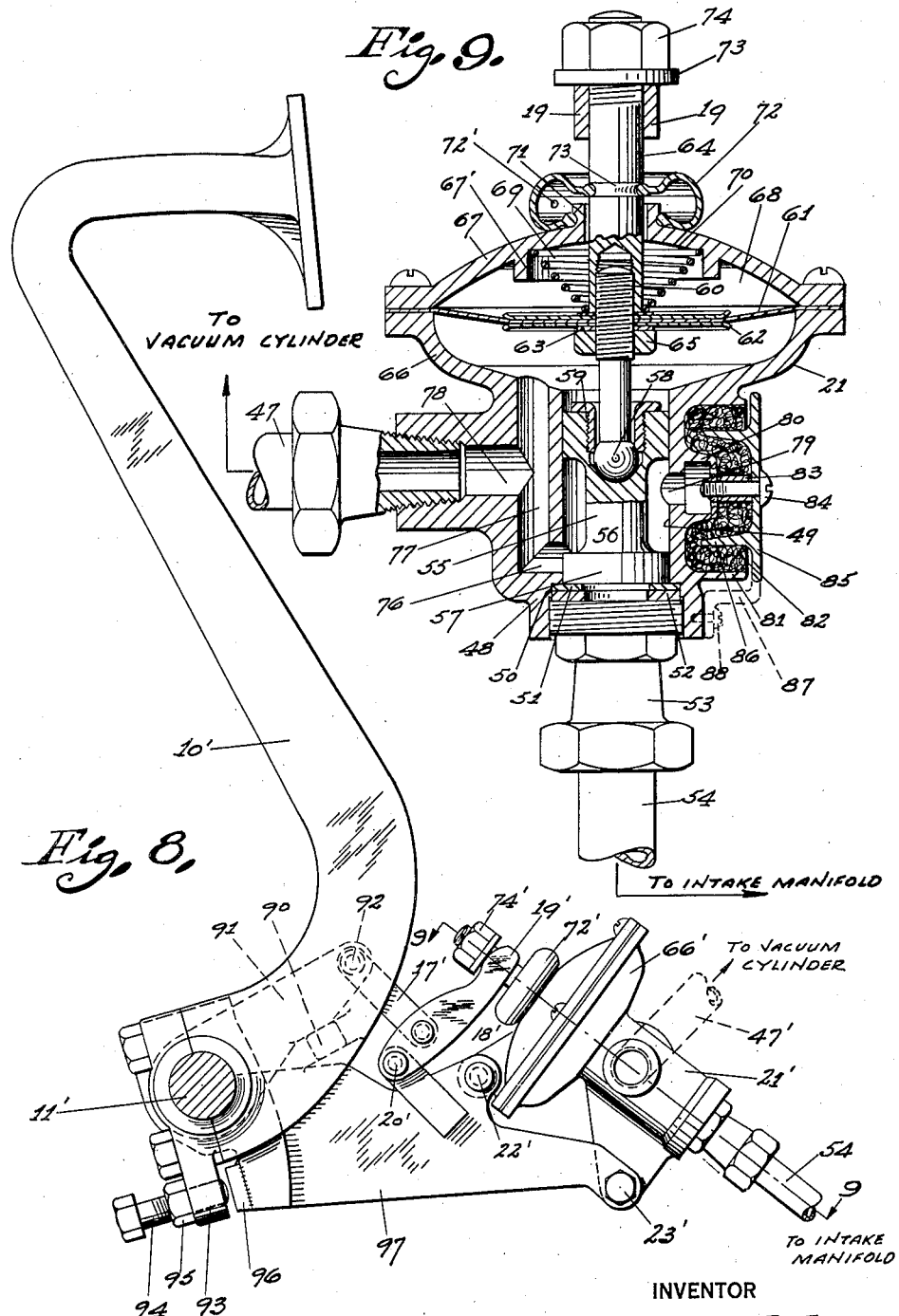

2,077,456

UNITED STATES PATENT OFFICE 2,077,456

VACUUM OPERATED BRAKE MECHANISM

Russell S. Begg, Cleveland Heights, Ohio, assignor to The Midland Steel Products Company, Cleveland, Ohio, a corporation of Ohio Application May 23, 1933, Serial No. 672,435

14 Claims. (Cl. 188—152)

This invention relates to new and useful improvements in vaccum operated brake mechanisms.

An important object of the invention is to provide a brake mechanism of the above type in which the braking effect is more exactly proportional to foot pedal pressure than in prior similar devices.

Another important object of the invention is to provide a power brake mechanism with which the brakes of a vehicle can be applied with practically the same leg movements as heretofore, but without the usual attendant physical exertion, or they may be applied with very light toe pressure. This is essential at this initial stage of adoption of power brakes for pleasure vehicles and until the public learns that cars with power brakes can be just as safely and quickly stopped with light pedal pressure as with the severe pressure which they have been accustomed to exercise for emergency applications of purely mechanical brakes.

Another important object of the invention is to provide a highly sensitive reaction type of control valve, which, under certain conditions automatically teeters between "on" and "off" positions to temper or modulate applications of the brake mechanism, and in which, due to its structure and hook-up with the pedal, gives maximum valve movement from minimum pedal movement.

A further object is to provide a mechanism which enables the operator to accurately sense the degree of brake application being made with an arrangement independent of mechanical hook-up leverage so that it will fit into the most congested types of automotive framing and be more simple and cheaper, and more durable.

A still further object is to provide a control valve casing mounted for variable location with respect to the brake shaft and possessing a single valve having movements within a very small range whereby slow normal pedal actuation causes the valve to modulate the action of the brake application at its very inception, but in an emergency application the valve will be controlled so that the modulating effect is retarded until the vehicle slows down.

Other objects and advantages of the invention will become apparent during the course of the following description.

In the accompanying drawings forming a part of the application and wherein like numerals are employed to designate like parts throughout the several views, Fig. 1 is a perspective view of the approved brake mechanism, parts thereof being broken away to ordinarily illustrate various parts in their assembled relationship, Fig. 2 is a side elevation of the same, Fig. 3 is an enlarged transverse section taken on the line 3—3 of Fig. 2, Fig. 4 is an enlarged transverse section taken on the line 4—4 of Fig. 2, Fig. 5 is a side elevation of the valve mounting link, Fig. 6 is a perspective view of a modified form of the brake mechanism with parts thereof broken away to further illustrate construction, Fig. 7 is a perspective view of the valve mounting, Fig. 8 is a side elevation of the brake mechanism, Fig. 9 is an enlarged longitudinal section of the control valve.

Referring now more particularly to the drawings and to the form of invention shown in Figs. 1 to 5 inclusive, the numeral 10, designates the usual foot pedal of an automotive vehicle loosely mounted upon a stub shaft 11 projecting from a transmission casing or any other suitable support. The lower end of this pedal is forked and provided with a pair of spaced perforated lugs 13 between which are pivotally connected at their forward ends a pair of carrier links 14 by means of pivot pin 15. As best seen in Figs. 3 and 5, the openings in the carrier links 14 through which the pin 15 extends, are in the form of slots 16 which constitutes a lost motion device between the pedal and valve as will be hereinafter described and permits a degree of relative movement between the foot pedal and the carrier links 14. Pivotally mounted on the pin 15 between the carrier links, is a valve lever operating link 17 which is pivotally connected as at 18 to the intermediate portions of a pair of valve operating levers 19. The lower ends of the valve operating levers 19 are pivotally connected as at 20 to the forward portion of the carrier links 14 and due to leverage obtained by this arrangement, minimum pedal movement will cause maximum valve movement. From Figs. 1 and 4 it will be noted that the intermediate portion of the pin 20 provided with an annular shoulder which is disposed between the valve levers 19 to space them apart and that the valve carrier links 14 are disposed upon the end of the pin. The pin 18 is disposed so that its ends may contact with the two links 37 to thereby prevent accidental displacement of the pin.

A valve casing 21 is connected to the valve carrier links 14 by means of a pair of lugs formed integral with the valve casing and secured between the carrier links 14 by the pins and bolts 22 and 23. These links 14 are cut away as at 24 to permit the valve casing to lie close thereto in a compact manner. The lower ends of the carrier links 14 are pivotally connected by pin 25 to a pair of spaced parallel links 26 which are pivotally connected as at 27 to one side of a lever arm 28 keyed to a cross shaft 29. This cross shaft is suitably journaled on the vehicle and at opposite ends has keyed thereto oppositely extending brake lever arms 30 and 31, the former being pivotally connected to brake rigging 32 extending to the forward brakes 32' of the vehicle and the arm 31 being pivotally connected to the rodding 33 extending to the rear brakes of the vehicle. The links 26 have a block secured therebetween, which block is provided with a threaded aperture for the reception of a thrust screw 34 provided with a lock nut and an end which is adapted to abut against a shoulder 35 of arm 28 for turning the cross shaft and applying the brakes at the front and rear of the vehicle. From the above it will be seen that the resistance to valve opening is supplied to some degree by the resistance offered by the cross shaft.

Upon initial depression of the foot pedal 10, the valve operating lever 19 is operated to the exclusion of any movement transmitted to the carrier links 14, due to the lost motion slots 16. However, when the pin 15 bottoms in the slots 16, the foot pedal will pick up and move the carrier links 14 and thereby move the thrust screw 34 into engagement with the shoulder 35 of lever arm 28 to rotate the cross shaft by means of physical force.

This cross shaft 29 is also moved by a vacuum power device by reason of the carrier links 14 being pivotally connected by pin 36 to the rear ends of a pair of links 37 which straddle the carrier links and at their forward ends are pivotally connected as at 38 to a power lever 39 loosely mounted upon the stub shaft 11 and having a portion extending through the bifurcated end of the foot pedal 10. The outer end of layer 39 is provided with a plurality of adjustment openings 40 by which different ranges of movement can be imparted to the lever through a piston rod 41 being pivotally connected as at 42 to the power lever 39. The other end of the rod 41 is connected to a piston 43 operating in a vacuum cylinder 44 arranged forwardly of the foot pedal and pivotally connected at its forward end by means of apertured ears 45, to a suitable support on the vehicle. As is customary in this type of device, the end 46 of the cylinder through which the piston rod passes is provided with a screened opening to the atmosphere permitting atmospheric pressure to enter on the right hand side of piston 43. The opposite end of the cylinder 44 is connected by a pipe 47 having a flexible portion to the intermediate portion of the valve casing 21 as best seen in Fig. 9.

The control valve 21 includes a substantially cylindrical die casting 48 having an axially extending valve bore 49 extending all the way through the casting and terminating at one end in a slightly enlarged bore forming a shoulder against which is clamped a gasket 51 forming a valve seat. This gasket is firmly clamped against the shoulder by means of a packing nut 52 having a passage therethrough in axial alignment with the bore 49 and in which is secured a coupling 53 connected with a pipe 54 which has a flexible portion and is connected to the intake manifold of an internal combustion engine for its source of suction or partial vacuum.

Reciprocably mounted in the bore 49 for exceedingly short opening and closing movements is a spool type valve 55 having its intermediate portion 56, reduced. The end 57 of this valve is adapted to seat upon the gasket 51 and cut off communication between the source of suction and the power or vacuum cylinder 44. The opposite end of the valve is provided with an axial cavity terminating in a ball seat for the reception of the ball end of a threaded stud 58. This ball end is retained in its pocket in the valve by means of a tubular nut 59 which is provided with sufficient clearance to enable the actuating stud 58 to move laterally without causing the valve to bind in the bore 49.

The stud 58 terminates in a threaded end 60 which extends through central aperture in a flexible diaphragm 61, relatively large discs 62 arranged on opposite sides of the diaphragm and washers 63 engaging the outer faces of the discs 62. This threaded end 60 of the stud is threaded into an axially extending opening in valve stem 64 and the diaphragm assembly is rigidly fastened to the valve stem by means of the thrust nut 65 which presses the assembly tight against the end of the valve stem.

A diaphragm 61 is disposed and clamped between the sections 66 and 67 of a diaphragm chamber 68, the section 66 being formed as an integral part of the valve casing. A conical spiral spring 69 surrounding the valve stem seats at its small end against a washer 63 and the larger end of the spring is disposed in a seat 70 formed by an annular flange 67' and one of its functions is to normally urge the valve 55 to closed positions and against the gasket 51. This flange 67' limits the movement of diaphragm 61 toward the section 67 to prevent damage to the same should an operator improperly adjust the pedal or apply excessive pressure on the same. Since resistance to valve opening is caused by cross shaft resistance and that offered by spring 69, the diaphragm 61 can be made small as compared to the area of piston 43, and consequently can be readily formed as part of the valve and accommodated in an unusually small space. Section 67 of the diaphragm chamber is provided with a central opening 71 which has sufficient clearance around the valve stem 64 to permit the entrance of atmospheric pressure to the outer side of the diaphragm 61. A small rubber annular boot 72 has one edge seated in a groove in the boss around opening 71 and the other end of the boot is positioned in a groove 73 in the valve stem to exclude extraneous matter from the diaphragm chamber. This boot has an aperture 72' to permit the entrance of atmospheric pressure. Upon the outer end of the valve stem 64 is a washer 73 and a nut 74, the former providing an abutment for the two valve levers 19 which straddle the stem as in Fig. 8 or if desired, the upper ends of the valve levers 10 may be fastened to a flat end of the valve stem by means of pin 75, Fig. 1.

To communicate the suction pipe 54 with the vacuum cylinder 44, the valve casing is provided with a lateral application port 76 which communicates with the forward end of the valve bore 49 and is only partially closed or covered by the end 57 of valve 55 when the latter is in its normal position with the brakes released. In other words, the portion 57 of the valve is co-extensive with the port 76 so that the portion 57 of the valve only travels a small fraction of an inch in an opening direction to completely cut off port 76. This is important from the standpoint of modulating or tempering the effect of the vacuum cylinder upon the brakes of the vehicle as will be more fully explained hereinafter. The port 76 communicates with one end of a longitudinal passage 77 in the valve casing and this passage communicates with the diaphragm chamber on the inner side of the diaphragm as clearly shown in Fig. 9. The intermediate portion of the passage 77 communicates with a port 78 which is in communication with pipe 47 which leads to the forward end of the vacuum cylinder 44.

The bore 49 for the piston valve has a lateral port 79 which communicates with the reduced portion 56 of the valve in all of its positions. The port 79 is surrounded by a boss 80 which in turn is disposed at the center of a pocket or cavity 81 adapted to be filled with air filtering material such as hair 82 for excluding extraneous matter from the bore of the valve 55. The boss 80 may be provided with a spider 83 having a central threaded perforation to receive the end of a screw 84 which passes through a cover 85 and a sleeve 86 surrounding the screw so as to space the cover sufficiently from the walls of cavity 81 to permit free entrance of atmospheric pressure through the filtering medium. This cover 85 may be provided with an annular flange 86 which tucks the filtering medium down within the cavity to retain it therein. If desired, the cover 85 may have an extension 87 which is adapted to bear against the side of the valve casing and be secured thereto by means of a small screw 88.

Fig. 9 shows the normal position of the valve with the brakes in release position and it will be observed that valve 55 is seated against the gasket 51 to cut off the admission of suction or a partial vacuum to the vacuum cylinder 44. At the same time, the reduced portion of the valve permits atmospheric pressure to enter the filtering medium into the bore 49 and thence through port 76, passage 77 and lateral port 78 into the rear end of the vacuum cylinder so that in brake release position, the piston 43 in the vacuum cylinder is submerged in atmospheric pressure. However, the piston 43 is retained adjacent the end of the cylinder having the atmospheric port by means of the usual brake retractor or other springs installed in the brake system.

With the parts in position shown in Figs. 1, 2 and 9 and the brakes in release position, when it is desired to apply the brakes by power, the operator slightly depresses the foot pedal 10. This movement immediately swings the valve lever on its fulcrum 20 while the valve carrying links 14 remain relatively stationary due to cross shaft resistance whereby the valve lever 19 will pull the valve 55 off of its seat against the tension of the spring 69 to slightly uncover the port 76 and set up communication of pipe 54 leading to the intake manifold with the vacuum cylinder. This sets up a partial vacuum in not only one end of the vacuum cylinder but also on one side of the diaphragm chamber via the passage 77. With atmospheric pressure on the opposite side of the piston 43 and diaphragm 61, the cross shaft 29 begins to move under the influence of the piston 43 through the instrumentality of lever 39 moving in a counter clockwise direction thereby pulling on links 37 and in turn upon the valve carrier links 14, while at the same time, the differential pressures in the diaphragm chamber cause the valve 55 to move toward its seat thereby exerting a pull on the foot pedal in opposition to the direction of force applied to the pedal by the operator's foot. Due to the slight amount of movement of the valve and its movement being dependent upon pedal pressure which in turn controls the degree of vacuum existing on one side of the diaphragm and also on one side of the power piston, the valve 55 will move to cover the port 76, which is augmented by the incidental change of location of the valve casing due to its connection with the cross shaft. In other words, the mechanism always tends to keep the valve 55 in balanced or lap position during an application of the brakes and when the foot pedal comes to rest in any intermediate position, the brakes are held applied without additional exertion on the part of the operator. As soon as pressure on the foot pedal is released, the spring 69 will move the valve from lap position to closed position shown in Fig. 9, whereupon the source of suction will be cut off and atmospheric pressure will enter through the filter around the reduced portion of the valve, into port 76 and thence into one end of the vacuum cylinder thereby permitting the piston therein to be returned to normal position and release the brakes, under the normal action of the usual brake retractor springs. In a brake application, it will be seen that the greater the pressure exerted upon the foot pedal, the greater will be the opening of the valve 75 thereby permitting a higher degree of vacuum to be created in the brake cylinder with more severe application of the brakes which will also result in a greater pull against the diaphragm 61 and thereby against the foot pedal to apprise the operator of the extent to which the brakes are applied as well as to create a proportionately increased force tending to return the valve to be balanced or lap position where the portion 57 of the valve just barely covers the port 76 so that the slightest amount of final closing movement of the valve will immediately let atmospheric pressure enter the passage 77 to temper or modulate the operation of the vacuum operated device and consequently the brakes.

It will be noted that by reason of the movement of the various parts, and their relationship, the manual operation of the brake follows very closely and in some cases can be made to follow simultaneously the power application so that should the engine stall or power fail for any reason the pin 15 is in position to immediately bottom in the slots 16 of the valve carrier links 14 so that further movement of the foot pedal will operate the links 26 and the lever arm 28 to manually operate the cross shaft and consequently the brake mechanism. It will therefore be seen that a safety factor has been provided which enables a full manual operation of the brake should the power medium fail. From observations of this mechanism in operation, it has been found, during progression of the foot pedal during a brake application, that the valve stem 64 teeters back and forth displaying the inherent tendency of the valve to balance all existent forces with a consequent continuous tempering of the partial vacuum set up by the slight periodic admission of atmospheric pressure to the valve. It is believed that this action explains the smoother and more gradual application of the brake than has been achieved with prior vacuum power brakes and in which the brakes are either definitely on or off to maximum degrees with no sense of smooth control such as derived from the present mechanism. This smooth application of the brakes is also believed traceable in some degree to the fact that the control valve is more or less indirectly controlled by the cross shaft movements and less directly than in previous installations; this indirect connection causing a change of location of the valve, rather than its movement being so directly proportional to the movement of the brake rigging. This of course, is possible, not solely by reason of the valve mounting, but also because of the provision of the diaphragm which is actuated to change the position of the valve depending upon the amount of vacuum existent in the brake cylinder or more strictly in the pipe lines leading to the brake cylinder. The beauty of the mechanism is that it permits of a power application of brakes with the usual foot and leg movement to which an operator is accustomed to use in the mere mechanical or manual operation of the brakes, because it permits the power actuation to operate just slightly in advance of the manual operation or practically in step with it while being tempered or modulated by the periodic admission of atmospheric pressure to the pipe line to prevent harsh power applications from running too far ahead of the usual manual operations. At the same time, it will be noted that an emergency stop with severe brake application can be derived from this mechanism due to the fact that an abrupt pressure on the foot pedal will place the power system so far beyond the recovery of the manual system that a quick stop may be made in emergencies and that the vehicle will be brought to a stop before the modulating action takes effect.

In the modified form of device shown in Figs. 6, 7 and 8, parts which correspond to parts of the form of invention just disclosed, are marked with corresponding numerals with prime coefficients to obviate repetition of the description of parts already hereinbefore described. In this modification, the foot pedal 10' is loosely mounted upon a cross shaft 11' which in this instance has the brake applying levers 30' and 31' connected to opposite ends thereof and extended to front and rear brakes. The foot pedal in this instance is formed with a lateral abutment 90 which is adapted to contact with a lever 91 mounted loosely upon the cross shaft. This lever 91 has its outer end pivotally connected as at 92 to a link 17' pivotally connected at its other end as at 18' to the valve operating lever 19'. It will be noted that there is no lost motion device directly in the linkage to the valve operating lever 19 as in the previous modification but the equivalent is provided by forming the brake pedal beneath its axis with a threaded aperture to receive a thrust screw 94 having a lock nut 95 associated therewith to prevent accidental displacement of any adjustments made. The end of this screw is adapted to be slightly spaced from a shoulder 96 formed on a valve casing carrier 97 so that should the power fail, a manual application of the brake can be made through the valve carrier by reason of the fact that it is provided with a bearing member 98 adapted to be keyed to the cross shaft 11'. This bearing is in the nature of a strip reversely bent to provide a pair of arms 99, each of which is provided with a keyed aperture to receive the cross shaft. This strip is provided with a slot 100 joining the two openings.

As in the preceding modification, the valve lever 19' is fulcrumed on a pin 20' secured to an extension of the valve carrier 97 and this carrier is provided with the pins 22' and 23' for mounting the valve casing.

In this modification, a different hook-up of the vacuum cylinder 44' is illustrated wherein it is located behind the cross shaft and its piston rod 41' is pivotally connected to a floating lever 101 fulcrumed at 102 between a pair of links 103 which are pivotally connected at 104 to a fixed part of the vehicle designated by the numeral 105. The upper end of the lever 101 is pivotally connected as at 106 to a yoke 107 through which the piston rod 41' passes and the lower end of the yoke is pivotally connected as at 108 to a lever 109 fixed to the cross shaft between the foot pedal and the brake levers 30'.

From the foregoing description, and with the valve operation the same as in the preceding form, it will be seen that depression of the pedal opens the valve and permits a partial vacuum to be created at the rear end of power cylinder 44'. This causes the piston 43' and rod 41' to move in the direction of the arrows in Fig. 6 thereby swinging lever 101 in a counter-clockwise direction causing a counter clockwise rotation of the cross shaft 11' with consequent application of the brakes. Should power fail, the foot pedal 10' will thrust the end of screw 94 into engagement with the shoulder 96 of the valve carrier, which being keyed to the cross shaft rotates the same for a brake application as previously described. During a power application it will be obvious that the valve carrier 97 in this modification being keyed to the cross shaft will be influenced in its movement by the cross shaft under the action of the vacuum cylinder piston so that the location of the valve shifts as in the preceding modification to assist in the tempering of a brake application by power unless severe pressure is exerted upon the pedal for an emergency stop.

In both modifications, it will be obvious that during a manual application of the brakes without the assistance of the vacuum cylinder, no stress whatsoever will be placed upon the diaphragm 61 or the valve parts since the braking force is transmitted around the valve parts by means of the valve carriers. Another feature of the valve mechanism is the fact that the valve stem 58 is universally connected with the piston valve so as to obviate any possibility of the piston valve being misaligned to score the bore.

It is to be understood that various changes in the construction and arrangement of parts may be resorted to without departing from the scope of the appended claims.

I claim:

1. A compensating valve for vacuum operated brakes comprising a valve casing having a bore and a suction port in its transverse end thereof, a diaphragm chamber at the opposite end of the bore, a piston valve in said bore having one end for closing said port, said casing having a lateral brake cylinder port from said bore, said piston valve slidable on the walls of said bore and cooperating with said brake cylinder port to open and close the same, a constantly open passage communicating said lateral port and chamber, a diaphragm in said chamber, and a valve stem secured to the valve and diaphragm.

2. A compensating valve for vacuum operated brakes comprising a valve casing having a longitudinally extending bore and a concentric suction port at one end thereof, a lateral air and suction port extending from the bore closely adjacent the suction port, a piston valve in said bore having one end normally closing said suction port, said valve having a lateral brake cylinder port closing portion exactly co-extensive with the lateral port and a reduced body portion, said port closing portion normally opening communication between the lateral port and the reduced body portion of the valve, said bore having an air port entering the same at the reduced portion of the valve in all its positions, a diaphragm chamber at the opposite end of the valve casing, a diaphragm in said chamber exposed on one side to atmospheric pressure, the other side of the diaphragm chamber being in constant communication with said lateral suction and air port, and a valve stem connected to the diaphragm and piston valve for controlling the position of the valve.

3. In combination, an operator operated part, a pedal shaft, brake mechanism operated thereby, a power device operated by differential pressure connected to said shaft, a carrier constituting a lost motion connection between the shaft and operator operated part, and being movable in an arc defined by a radius of the pedal shaft, a control valve casing carried by said carrier, a piston valve in said casing connected to the operator operated part, a diaphragm in said valve casing arranged concentric with the piston valve, and said valve casing having a suction port open to one side of the diaphragm upon opening movement of the valve away from said suction port.

4. In combination, an operator operated part, a pedal shaft, brake mechanism operated thereby, a power device operated by differential pressure connected to said shaft, a carrier constituting a lost motion connection between the shaft and operator operated part, a control valve casing carried by said carrier and movable on an arc struck from the axis of said shaft, said valve casing having a piston valve therein, and said casing having a valve stem connected to the piston valve.

5. In combination, a foot pedal having a bifurcated end, a shaft, a brake mechanism operated thereby, a power device operated by differential pressures connected to said shaft, a carrier constituting a lost motion connection between the shaft and pedal, a control valve casing carried by said carrier, a piston valve in said casing, a valve lever fulcrumed upon the carrier and connected with said valve, a link connecting the foot pedal with said valve lever, a power lever mounted co-axially with the foot pedal and having an extension projecting through the bifurcation of the pedal, said lever being connected with the power device and a link connecting said power lever with said carrier.

6. In combination, a foot pedal, a pedal shaft, a brake cross shaft, brake mechanism operated thereby, a power device operated by differential pressures, a carrier constituting a lost motion connection between the cross shaft and pedal, an arm secured to the cross shaft and having an abutment, a link pivotally connecting said arm and carrier and having a thrust element adapted to engage said abutment, a control valve casing carried by the carrier and having a valve connected to the foot pedal, a power lever mounted on the pedal shaft and connected to the power device, and a link connecting said power lever with said carrier.

7. In combination, a foot pedal, a shaft, a brake mechanism operated thereby, a power device operated by differential pressures connected to said shaft, a valve carrier movable about the axis of said shaft, a control valve casing mounted on said carrier and having a valve connected to the foot pedal, said valve casing having a diaphragm therein by which the valve is urged toward closed position during a brake application, and a valve operator mounted on the carrier and connected with the valve and pedal, and an abutment carried by the pedal normally spaced from the carrier and adapted to engage the carrier to move the same with the valve casing to relieve the latter of stress during manual application of the brakes.

8. In combination, a foot pedal, a shaft, a brake mechanism operated thereby, a power device operated by differential pressures connected to said shaft, a carrier constituting a lost motion connection between the shaft and pedal, a control valve casing mounted on said carrier and having a valve connected to the foot pedal, said casing having a diaphragm by which the valve is urged toward closed position by said differential pressures acting on the diaphragm during a brake application, and a valve operator pivoted to the carrier and connected with the valve and pedal.

9. In combination, a foot pedal, a shaft, a brake mechanism operated thereby, a power device operated by differential pressures connected to said shaft, a carrier constituting a lost motion connection between the shaft and pedal, a control valve casing mounted on said carrier and having a bore and a suction port at one end thereof, a diaphragm chamber at the opposite end of the bore, a piston valve in said bore having one end for closing said port, said casing having a lateral port from said bore, a passage communicating said lateral port and chamber, a diaphragm in said chamber, and a valve stem secured to the valve and diaphragm and connected with the foot pedal.

10. In combination, a foot pedal, a shaft, a brake mechanism operated thereby, a power device operated by differential pressures connected to said shaft, a carrier constituting a lost motion connection between the shaft and pedal, a control valve casing mounted on said carrier and having a longitudinally extending bore and a suction port at one end thereof, a lateral air and suction port extending from the bore closely adjacent the suction port, a piston valve in said bore having one end normally closing said suction port, said valve having a lateral port closing portion exactly coextensive with the lateral port and a reduced body portion, said port closing portion normally opening communication between the lateral port and the reduced body portion of the valve, said bore having an air port entering the same at the reduced portion of the valve in all of its positions, a diaphragm chamber at the opposite end of the valve casing, a diaphragm in said chamber exposed on one side to atmospheric pressure, the other side of the diaphragm chamber being in constant communication with said lateral suction and air port, a valve stem connected to the diaphragm and piston valve for controlling the position of the latter and having connections with said foot pedal.

11. In combination, a foot pedal, a pedal shaft, a brake mechanism connected directly thereto, a power device operated by constantly available differential pressures connected to said shaft, a carrier movable on an arc struck from substantially the axis of the pedal shaft and constituting a lost motion connection between the shaft and pedal, a control valve casing mounted on said carrier and having a valve connected to the foot pedal and urged toward closed position by said differential fluid pressures during a brake application.

12. In combination, a foot pedal, a pedal shaft, a brake mechanism operated thereby, a power device operated by differential pressures connected to said shaft, a carrier movable on an arc struck from substantially the axis of the pedal shaft and constituting a lost motion connection between the shaft and pedal, a control valve casing mounted on said carrier, a piston valve in said casing connected to the foot pedal, and a diaphragm connected to said valve and being subject to differential pressures upon brake application to urge the piston valve to an intermediate balanced position.

13. In combination, a foot pedal, a shaft, a brake mechanism operated thereby, a power device operated by differential pressures connected to said shaft, a carrier constituting a lost motion connection between the shaft and pedal, a control valve casing mounted on said carrier and having an application port, a diaphragm chamber having an imperforate diaphragm subject to application port pressure to react upon said pedal, a piston valve in said casing connected to the foot pedal and diaphragm and partially covering said port in its normal inoperative position, the port closing portion of the valve being exactly coextensive with said port whereby this port is normally partially uncovered by said valve.

14. In combination, a foot pedal, a shaft, a brake mechanism operated thereby, a power device operated by differential pressures connected to said shaft, a carrier constituting a lost motion connection between the shaft and pedal, a control valve casing mounted on said carrier and having an application port, a diaphragm chamber having a diaphragm subject to application port pressure to react upon said pedal, a piston valve in said casing connected to the foot pedal and to the diaphragm and partially covering said port in its normal inoperative position, and a suction port and an atmospheric port in the valve casing on opposite sides of said first mentioned port.

RUSSELL S. BEGG.